United States Patent [19]

Neumann et al.

[11] 4,177,244

[45] Dec. 4, 1979

[54] PROCESS FOR PURGE STREAM TREATMENT IN REMOVAL OF SULFUR DIOXIDE

[76] Inventors: Ullrich Neumann, Kiefernweg, 5038 Rodenkirchen; Kurt Rudolph, Benfleetstr. 16, 5000 Cologne 40, both of Fed. Rep. of Germany

[21] Appl. No.: 821,481

[22] Filed: Aug. 3, 1977

Related U.S. Application Data

[63] Continuation of Ser. No. 818,722, Jul. 25, 1977, abandoned.

[30] Foreign Application Priority Data

Jul. 24, 1976 [DE] Fed. Rep. of Germany ....... 2633423

[51] Int. Cl.$^2$ .................. C01B 17/00; C01B 17/45
[52] U.S. Cl. ............................ 423/242; 423/512 A
[58] Field of Search .............. 423/242, 512, 512 A, 423/551

[56] References Cited

U.S. PATENT DOCUMENTS

| | | | |
|---|---|---|---|
| 3,542,511 | 11/1970 | Shah | 423/242 |
| 3,653,812 | 4/1972 | Schneider et al. | 423/242 |
| 3,971,844 | 7/1976 | Schneider | 423/242 X |
| 3,989,797 | 11/1976 | Brady | 423/242 |
| 4,003,985 | 1/1977 | Hoffman et al. | 423/512 A |

FOREIGN PATENT DOCUMENTS

| | | | |
|---|---|---|---|
| 848119 | 11/1976 | Belgium . | |
| 45-12572 | of 1970 | Japan | 423/512 |
| 49-42592 | of 1974 | Japan | 423/512 A |
| 51-6115 | of 1976 | Japan | 423/242 |

OTHER PUBLICATIONS

Japanese Patent Application Ser. No. 696-1977, 7-1-6-1977.
Japanese Patent Application Ser. No. 149008, 8-3-1976.

*Primary Examiner*—Delbert E. Gantz
*Assistant Examiner*—Gregory A. Heller
*Attorney, Agent, or Firm*—Bernard & Brown

[57] ABSTRACT

A process for treating the purge stream from an aqueous sodium sulfite/sodium bisulfite solution used in the removal (recovery) of sulfur dioxide from gas is provided wherein the purge stream is mixed with sodium hydroxide or sodium carbonate, the mix is cooled and sodium sulfite hydrate is crystallized and recycled for recovery of sulfur dioxide, and the residual mother liquor containing impurities is discarded.

11 Claims, 1 Drawing Figure

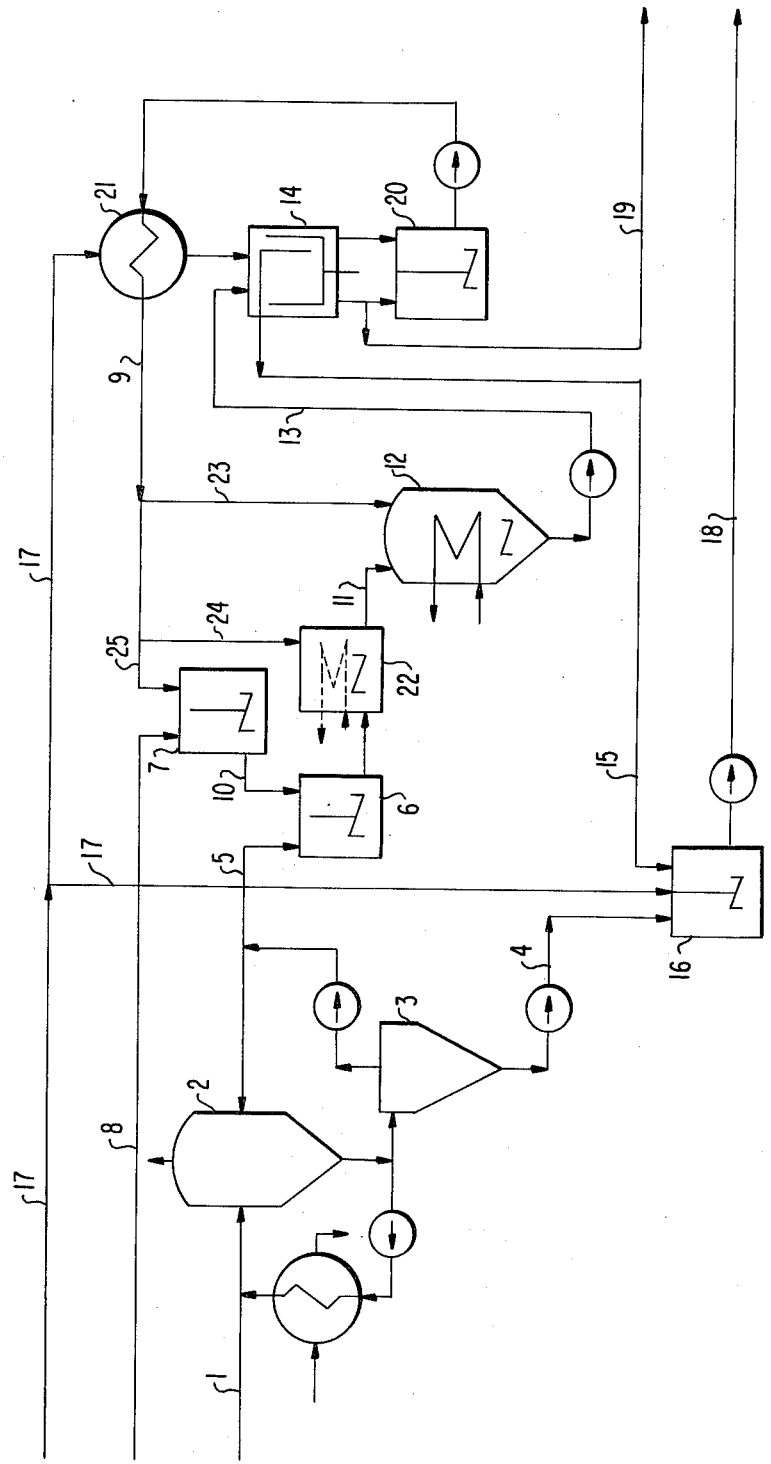

PROCESS FOR PURGE STREAM TREATMENT IN REMOVAL OF SULFUR DIOXIDE

This is a continuation, of application Ser. No. 818,722, Filed July 25, 1977, now abandoned.

This invention relates to a process for removing sulfur dioxide from a gas in which sulfur dioxide is absorbed by means of a aqueous sodium sulfite/bisulfite solution, and the solution is regenerated by evaporation to form a gas rich in $SO_2$ and to separate a solid substantially consisting of sodium sulfite, for preparing fresh absorbing solution. The process according to the invention is especially advantageous in connection with a process for removing sulfur dioxide from flue gases formed by burning coals containing chloride and/or selenium and e.g. also fluoride.

In processes which use sulfite/bisulfite for sulfur dioxide removal (recovery), minor amounts of sodium sulfate, e.g. 1 to 10 percent sodium sulfate are formed by oxidation of sulfite in the absorbing solution with most of all gases to be desulfurized, which sodium sulfate must be removed from the circulating solution so that the sulfate content does not increase too much. For this purpose a partial stream of the solution is cooled to low temperatures to crystallize a mixture of sodium sulfate decahydrate and sodium sulfite heptahydrate. The crystallized product is separated from the mother liquor, and the mother liquor is recycled into the evaporation stage of the absorbent cycle. Other impurities, e.g. sodium thiosulfate, sodium chloride, selenium, which are slightly soluble even at low temperatures and are formed in smaller amounts, cannot be removed in this way. It is desirable, however to keep these impurities in the absorbing solution as low as possible, too, because they decrease the absorption capacity of the solution, may control the oxidation or disproportionation of the sulfite or cause an increased stress of the material in the absorbent cycle (chloride). Up to now small regard was payed to these impurities, because first of all flue gases from fuel oil combustion or waste gases from chemical production plants were to be purified in which gases the above-mentioned impurities are not important. Therefore it was sufficient to discharge only a small partial stream of the mother liquor from the evaporation stage whereby especially the thiosulfate was removed. Aside from the alkali losses this discharged amount of mother liquor also causes an impairment of the environment because the solution contains much sulfite and bisulfite. The discharged amount is even increased with the flue gas purification of coal-fired power plants because coal generally contains a greater proportion of impurities. It is desirable to avoid these disadvantages, i.e., the environmental impairment and the alkali losses due to the purge of the liquor.

The object of the invention is to provide a process of the above-mentioned type for removing sulfur dioxide from gases in which the concentration of undesired soluble impurities, e.g. especially sodium thiosulfate, sodium chloride and selenium, in the absorbing solution as well as the loss of sodium ions due to discard are kept low. Another object of the invention is to decrease the corrosive effect of the absorbing solution.

According to the invention at least a portion of the evaporated solution is mixed with sodium hydroxide and/or sodium carbonate, the mixture is cooled to crystallize sodium sulfite hydrate, the salt hydrate is separated from the residual liquor and recycled to the absorbent cycle, e.g. to the vessel used for preparing fresh liquor, and the residual liquor is discarded. The residual mother liquor from the regeneration of the absorbing solution after having separated the deposited solids, contains sodium sulfite, sodium pyrosulfite, sodium sulfate, sodium thiosulfate, sodium chloride, and selenium, as the case may be. The solution is saturated with sodium sulfite; the very soluble sodium pyrosulfite is the main component. The sodium thiosulfate content is limited to about 0 to 3%, preferably 0 to 1.5%. The sodium pyrosulfite is converted to sodium sulfite according to the reactions

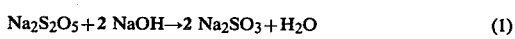

$$Na_2S_2O_5 + 2\ NaOH \rightarrow 2\ Na_2SO_3 + H_2O \quad (1)$$

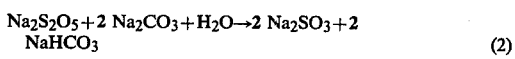

$$Na_2S_2O_5 + 2\ Na_2CO_3 + H_2O \rightarrow 2\ Na_2SO_3 + 2\ NaHCO_3 \quad (2)$$

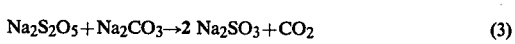

$$Na_2S_2O_5 + Na_2CO_3 \rightarrow 2\ Na_2SO_3 + CO_2 \quad (3)$$

by mixing the mother liquor with the sodium hydroxide and/or sodium carbonate solution, said mother liquor preferably being hot from the evaporation step. The conversion (3) is not quite complete near the equivalence point because the conversion (2) partially takes place.

The solubility of the sodium sulfite in the hot solution can be exceeded, and the anhydrous sodium sulfite partially crystallizes. Subsequently the hot slurry is cooled; preferably it is primarily cooled in a heat exchanger by means of cold residual liquor and then in a cooling crystallizer with a coolant. Sodium sulfite heptahydrate and sodium sulfate decahydrate are precipitated in the cooling crystallizer. These hydrates bind a substantial portion of the water as hydrate water which water is introduced as mother liquor, sodium hydroxide solution or sodium carbonate solution and washing water, as the case may be, into the process of the invention so that the undesired very soluble impurities mainly contained in the mother liquor are concentrated in the residual liquor.

The solid salt hydrates are separated, preferably centrifuged from the concentrated residual liquor, and subsequently recycled into the the absorbent cycle of the basic desulfurization process. It is no disadvantage that the sodium sulfate decahydrate comes into the absorbing solution again because this salt is removed separately from the rest of the impurities at another stage, and the amount of the sulfate recycled in this way is small compared with the amount of the removed sulfate.

According to the process of the invention, the sodium sulfate decahydrate as well as the sodium sulfite heptahydrate serves for depriving the residual liquor of water by forming hydrate and for preparing a solution relatively concentrated with very soluble impurities, the discard of this solution being accompanied by comparatively small losses of sodium. The residual liquor enriched in undesired slightly soluble impurities, especially sodium thiosulfate and sodium chloride, only containing a small amount of dissolved sodium sulfite and is discarded.

Preferably, the absorbing solution also contains sodium sulfate, and sodium sulfate hydrate is in addition to sodium sulfite hydrate, crystallized from the mixture obtained with the treatment according to the invention. Generally, the sodium sulfate is present in the absorbing solution with the desulfurization of oxygen containing waste gases which is the usual case.

According to a special embodiment of the process of the invention, a portion of the evaporated solution is mixed with an amount of sodium carbonate which is greater than required for the neutralization of the sodium bisulfite, and sodium carbonate hydrate is also crystallized in addition to sodium sulfite hydrate. In this way the sodium carbonate contributes by its hydration to concentrate the impurities in the residual liquor. Moreover, the sodium carbonate needed as make-up can at first be exclusively used in the reprocessing of the invention so that it is no longer necessary to prepare two different sodium carbonate solutions, namely a first solution based on condensate to be used as make-up solution for the absorbent cycle, and a second solution based on residual liquor to be used for the neutralization in the reprocessing of the invention. When working in this manner with an over-stoichiometric amount of sodium carbonate it is not necessary to use solid ($Na_2SO_3$) from the regeneration in the reprocessing of the invention.

According to a further embodiment of the invention, a portion of the solid obtained in the evaporation stage and the evaporated solution are mixed with the sodium hydroxide or with the sodium carbonate. This solid substantially consists of anhydrous $Na_2SO_4$-containing sodium sulfite. It also serves for binding additional water by forming heptahydrate in the crystallizing stage.

According to an embodiment of the invention, the withdrawn portion of the evaporated solution is mixed with sodium hydroxide solution because the sodium pyrosulfite contained in the solution can be completely neutralized with sodium hydroxide to form sodium sulfite. When using sodium carbonate the pyrosulfite is not completely neutralized according to the corresponding dissociation constants so that the residual liquor still contains in solution a small amount of sodium pyrosulfite and also some sodium bicarbonate according to the equilibrium which is established according to reaction (2).

According to the preferred embodiment of the invention, the mixture of the evaporated solution and the sodium hydroxide or sodium carbonate solution is cooled to a temperature in the range from about $-10°$ to $+20°$ C. to crystallize salt hydrates. The cooling temperature must not be so low that the mixture as a whole freezes. Higher temperatures result in a smaller hydrate deposition and accordingly in a smaller concentration of the residual liquor. Crystallizers known per se, e.g. agitator crystallizers and drum crystallizers can serve for the cooling crystallization. The preferred cooling temperatures for the crystallization of the hydrates is in the range from about $-1°$ to $+10°$ C.

Preferably, the greater portion of the residual liquor remaining after separation of the salt hydrates is recycled into the cooling crystallization stage, and only the smaller portion of the residual liquor is directly discarded. In this manner a solids content is adjusted, which is favorable for crystallizing conveying and separating, especially centrifuging, the slurry. The ratio of the discarded residual liquor volume to the recycled residual liquor volume is in the range from 1:2 to 1:100, preferably in the range from 1:5 to 1:50. The residual liquor remaining after the separation, especially centrifugation of the salt hydrates can be recycled inter alia partially directly into the cooling crystallizer stage and partially into the stage for preparing the alkaline solution, or the recycled residual liquor can be used as a whole for preparing the alkaline solution.

Suitably, the greater portion of the residual liquor is heated, preferably by heat exchange with the hot mixture formed from the evaporated solution and the alkaline solution. Subsequently concentrated sodium hydroxide solution is diluted and/or solid sodium carbonate is dissolved with this residual liquor, and the basic solution obtained in this manner is mixed with the evaporated solution. In this way it is avoided to bring additional water into the reprocessing cycle of the invention by means of the dilution of the used sodium hydroxide and/or the dissolution of the sodium carbonate which water would cause an increased volume of the residual liquor and consequently an increased loss of sodium ions at otherwise same conditions. With the process of the invention the sodium chloride contained in the sodium carbonate and in the sodium hydroxide, as the case may be, directly comes into the residual liquor so that an additional charge of the absorbent cycle with sodium chloride is avoided.

The salt hydrates can be washed with a small amount of cold water after having been separated from the residual liquor. It is avoided in this manner that residual liquor adhering to the salt hydrate, and consequently a remarkable portion of the impurities to be separated returns to the absorbent cycle together with the salt hydrate. At any rate the amount of the washing water should be small so that an unnecessary increase of the volume of the residual liquor and consequently an increased loss of sodium ions is avoided.

Furthermore, according to a preferred embodiment of the invention, the salt hydrates together with the solid obtained in the evaporation stage is dissolved in order to prepare fresh absorbing solution. The fresh absorbing solution obtained in this manner is recycled into the absorption stage of the basic desulfurization process. As mentioned above, recycling of sodium sulfate into the absorption cycle is no disadvantage because this amount of sulfate is small compared with the whole amount of sulfate to be discarded so that apart from this a special separation of sodium sulfate must be provided. The process of the invention, however, substantially aims at a decrease of the concentration of the very soluble impurities which are normally enriched in the absorption cycle, and, inter alia, catalyze the formation of sulfate.

In the process of the present invention for removing sulfur dioxide from a sulfur dioxide containing gas, the absorption is generally carried out with an aqueous sodium sulfite/sodium bisulfite solution at temperatures in the range from 32° to 110° C., preferably in the range from 37° to 90° C., and especially between 48° and 83° C. The evaporative regeneration of the absorbing solution is generally carried out at temperatures in the range up to 149° C., preferably in the range from 70° to 110° C. and especially in the range from 77° to 93° C. dr The drawing represents a schematic flow diagram showing one embodiment of the impurities removal process of the present invention. The flow diagram illustrates treatment of a spent absorption solution/slurry from a sulfur dioxide recovery system. Such treatment involves (1) neutralizing the solution/slurry to precipitate hydrated sodium sulfite and sodium sulfate therefrom. The residual impurities—containing solution is thereafter partially discarded and partially recycled to the impurities removal system. The drawing is described in more detail hereinafter.

The invention is in detail described herebelow with respect to the drawing in which the substantial part of the plant for carrying out the process of the invention is represented as a flow sheet.

The spent absorbing solution from the absorber not shown passes via line 1 into the forced-circulation evaporator crystallizer 2 in which a portion of the bisulfite-enriched solution is thermally decomposed into sulfur dioxide, water and crystallizing sodium sulfite. The sodium sulfite slurry is withdrawn from the bottom of the evaporator 2 and separated in the separator 3 into a concentrated slurry and a mother liquor which may contain solids or may be free of solids.

The mother liquor is substantially fed to a neutralization reactor 6 provided with an agitator, via line 5. Using suitable measures of process engineering, a solids-containing mother liquor can be withdrawn from separator 3 and fed to neutralization reactor 6. Moreover, a portion of the concentrated slurry containing anhydrous sodium sulfite crystals can be also passed to the reactor 6 (not shown). Sodium hydroxide solution containing 50% NaOH and fed via line 8 is mixed with residual liquor recycled via line 9/25 in a preparation tank 7. This mixture is also fed via line 10 to the neutralization reactor 6 in which the sodium pyrosulfite contained in the mother liquor is neutralized to sodium sulfite. As the case may be, the solubility of the sodium sulfite in the neutralization mixture is exceeded by this means so that further anhydrous sodium sulfite crystallizes from the hot solution. The neutralization temperature is generally in the range from about 40° to 110° C., preferably in the range from about 40° to 90° C. when neutralizing with sodium carbonate solution, and preferably in the range from about 70° to 110° C. when neutralizing with sodium hydroxide solution. The final pH-value of the neutralization is above 6, preferably in the range from about 7 to 10.

Then the neutralization mixture passes into the agitated cooling vessel 22 which, if desired, is cooled and to which also cold residual liquor can be fed via line 9/24. The neutralization mixture is intermediately cooled to the temperature of maximum solubility of sulfite and sulfate (about 35° C.), in the cooling vessel 22 and then it is passed via line 11 to the cooling crystallizer 12 which is provided with an agitator and a cooler charged with cooling brine, and which can be also charged with residual liquor via line 9/23. The slurry is cooled to about 5° C. in the cooling crystallizer 12 whereby greater amounts of sodium sulfite heptahydrate and smaller amounts of sodium sulfate decahydrate crystallize and the present anhydrous sodium sulfite hydrates, as the case may be. In this way the water content of the residual liquor is reduced and the undesired impurities are accordingly concentrated. The cold hydrate slurry is conveyed via line 13 into the centrifuge 14 in which the salt hydrates are separated from the residual liquor.

The separated salt hydrates flow via line 15 into the dissolving tank 16 in which they are dissolved together with the concentrated slurry of anhydrous sulfite fed from separator 3 via line 4 with addition of acid condensate from line 15, to form fresh absorbing solution. The fresh absorbing solution is pumped back via line 18 to a buffer tank for charging it to the absorber for the $SO_2$-containing gas (not shown). The smaller portion of the residual liquor obtained as centrifugate is discarded via line 19. The greater portion of the residual liquor is collected in a pump feed tank 20 and pumped through the heat exchanger 21 in which it is heated by means of acid condensate, via line 9 to the preparation vessel 7 for dilution of the used sodium hydroxide, to the cooling vessel 22 or to the cooling crystallizer 12.

When neutraulizing with sodium hydroxide, several embodiments can be utilized. In one, the sodium hydroxide is diluted in the preparation tank 7 with residual liquor fed via line 9/25. The diluted sodium hydroxide solution is used in the neutralization reactor 6. The neutralization mixture is cooled to the maximum solubility in the cooling vessel 22, residual liquor being added via line 24 for adjusting the temperature to the maximum solubility, as the case may be. The cooling crystallizer 12 is not charged with residual liquor via line 23.

In another, a preferred embodiment using sodium hydroxide, the undiluted sodium hydroxide passes to the neutralization reactor 6, i.e. no residual liquor is fed via line 9/25. The neutralization mixture is cooled in the cooling vessel 22 to the maximum solubility with addition of residual liquor via line 9/24 and subsequently passes to the cooling crystallizer 12 to which residual liquor is not fed via line 23, either.

When neutralizing with a sodium carbonate solution, several embodiments can be used. In one embodiment, the solid sodium carbonate is dissolved in the preparation tank 7 by means of residual liquor fed via line 9/25. The sodium carbonate solution is used for the neutralization in the neutralization reactor 6. The cooling to the temperature of maximum solubility is brought about in the cooling vessel 22 by indirect cooling without addition of further residual liquor. In the cooling crystallizer 12 residual liquor is again added via line 9/23 in order to adjust an optimum solids content for the crystallization. In this case no residual liquor is added through line 9/24.

In another embodiment using sodium carbonate, only as much residual liquor as necessary for preparing a sodium carbonate slurry is fed to the preparation vessel 7 via line 9/25. The mother liquor in the neutralization tank 6 is neutralized by this soda slurry. The neutralization mixture is mixed in the cooling vessel 22 with such an amount of residual liquor supplied via line 9/24 that the temperature in the vessel is adjusted to the maximum solubility. The mixture passes via line 11 to the cooling crystallizer 12 to which, however, no residual liquor is fed via line 9/23.

The process of the invention is illustrated with the following examples:

EXAMPLE 1

85 Kg anhydrous soda, is mixed, in a preparation tank, with 481 residual liquor from the cooling crystallization having the following composition:
9.5 weight percent sodium sulfite,
2.1 weight percent sodium sulfate,
5.0 weight percent sodium chloride,
1.3 weight percent sodium thiosulfate, and
82.1 weight percent water.
Then 534 kg mother liquor consisting of
5.9 weight percent sodium sulfite,
28.4 weight percent sodium pyrosulfite,
5.1 weight percent sodium sulfate,
0.56 weight percent sodium chloride,
0.15 weight percent sodium thiosulfate, and
60.0 weight percent water, from the separator connected with the regeneration stage of a flue gas desulfurization with sodium sulfite/sodium bisulfite solution are neutralized with the soda solution obtained in this manner. The neutralization is carried out in a stirred reactor at a temperature of about 75° C. Additional, 510 kg residual liquor are added to the neutralization mixture which is subsequently cooled to 5° C. and agitated whereby sodium sulfite heptahydrate and sodium sulfate decahydrate crystallize. The salt hydrates are centrifuged to separate them from the residual liquor, and washed with 112 kg water. A solid hydrate mixture, 699 kg, is obtained consisting of the following:
80.4 weight percent sodium sulfite heptahydrate,
12.7 weight percent sodium sulfate decahydrate,
0.3 weight percent impurities, and
6.6 weight percent free water.

The hydrate mixture is used for preparing fresh absorbing solution. 1041 Kg residual liquor of the above-indicated composition are obtained, 991 kg of this amount are recycled and used for dissolving soda and for diluting the feed solution for the cooling crystallizer. The remaining 50 kg residual liquor are discarded from the process.

EXAMPLE 2

113 Kg anhydrous soda are dissolved with agitation in 873 kg residual liquor having a temperature of 25° C. and the following composition:
7.4 weight percent sodium sulfite,
1.7 weight percent sodium sulfate,
4.5 weight percent sodium chloride,
2.0 weight percent sodium thiosulfate,
3.6 weight percent sodium carbonate, and
81.8 weight percent water.
334 Kg mother liquor of the following composition,
5.9 weight percent sodium sulfite,
28.4 weight percent sodium pyrosulfite,
5.1 weight percent sodium sulfate,
0.45 weight percent sodium chloride,
0.23 weight percent sodium thiosulfate, and
60.0 weight percent water,
are substantially neutralized with 460 kg of the obtained soda solution at 75° C. with $CO_2$ generation. The remaining 527 kg of the soda solution are added to the neutralization mixture after cooling it to about 35° C. The neutralization mixture is further cooled to 5° C. and crystallized with agitation. The deposited hydrate mixture is centrifuged and washed with 129 kg cold water. Then it consists of
31.0 weight percent sodium carbonate decahydrate,
55.7 weight percent sodium sulfite heptahydrate,
7.3 weight percent sodium sulfate decahydrate,
0.1 weight percent impurities, and
5.9 weight percent water.
The hydrate mixture (514 kg) is used for preparing fresh absorbing solution. 837 Kg of the obtained 906 kg residual liquor are used for dissolving the solid soda. The remaining 33 kg residual liquor are discarded in order to remove the impurities.

EXAMPLE 3

713 Kg of a slurry from the separator connected with the absorption stage of a flue gas desulfurization using sodium sulfite/sodium bisulfite solution, consisting of 607 kg mother liquor, the composition and origin of which are indicated in Example 1, and 104 kg of a salt mixture, are neutralized with 145 kg of a 50 percent sodium hydroxide solution. The salt mixture consists of 80 percent by weight sodium sulfite and 20 percent by weight sodium sulfate. The slurry has the following average composition:
14.9 weight percent solids,
16.9 weight percent sodium sulfite,
24.2 weight percent sodium pyrosulfite,
7.3 weight percent sodium sulfate,
0.47 weight percent sodium chloride,
0.13 weight percent sodium thiosulfate, and
51.0 weight percent water. The neutralization is carried out at about 105° C. Then 1283 kg residual liquor having a temperature of about 7° C. and the composition indicated in Example 1 are added to the neutralization mixture whereby a temperature of 37° C. is adjusted and the solids are substantially dissolved. With further cooling to 5° C. and agitation, sodium sulfite heptahydrate and sodium sulfate decahydrate crystallize. The salt hydrates are centrifuged. 858 Kg of hydrate mixture are obtained which consists of
80.2 weight percent sodium sulfite heptahydrate,
13.4 weight percent sodium sulfate decahydrate,
0.1 weight percent impurities, and
6.3 weight percent free water.
The hydrate mixture is used for preparing fresh absorbing solution. 1340 Kg residual liquor of the composition indicated in Example 1 are formed. 1283 Kg residual liquor are heated to 30° C. and used to dilute the sodium hydroxide solution. The remaining 57 kg residual liquor are discarded from the process.

It is claimed:
1. In the process for removing sulfur dioxide from a gas whereby sulfur dioxide is absorbed by an aqueous sodium sulfite-containing absorbing solution to thereby form a sodium bisulfite-enriched solution, which bisulfite-enriched solution is subsequently thermally decomposed to evaporate sulfur dioxide and water therefrom, thereby forming an aqueous slurry comprising solid sodium sulfite and a mother liquor containing dissolved salts including sodium sulfite, sodium pyrosulfite, sodium sulfate and dissolved impurities selected from the group consisting of sodium thiosulfate, sodium chloride and selenium, the improvement which comprises:
 a. mixing at least a portion of said mother liquor with a neutralizing agent selected from sodium hydroxide, sodium carbonate or both;
 b. cooling the resulting neutralization mixture to crystallize sodium sulfite hydrate therefrom;
 c. separating said crystallized sodium sulfite hydrate from said neutralization mixture thereby leaving a residual liquor containing the dissolved impurities;
 d. recycling said separated sodium sulfite hydrate to the sulfur dioxide absorbing solution; and
 e. discarding at least a portion of said residual liquor in order to remove dissolved impurities from the process.

2. The process of claim 1 wherein the absorbing solution also contains sodium sulfate, and sodium sulfate hydrate is crystallized from the mixture in addition to sodium sulfite hydrate.

3. The process of claim 2 wherein the portion of the mother liquor is mixed with an amount of sodium carbonate neutralizing agent which is greater than required for neutralization, and sodium carbonate hydrate is also crystallized in addition to sodium sulfite hydrate.

4. The process of claim 2 wherein a portion of the solid sodium sulfite from the aqueous slurry and the mother liquor are mixed with the neutralizing agent.

5. The process of claim 4 wherein the mixture is cooled to a temperature in the range from about $-10°$ to $+20°$ C. to crystallize the salt hydrates.

6. The process of claim 5 wherein the greater portion of the residual liquor remaining after separation of the salt hydrates is recycled into the cooling crystallization stage, and only the smaller portion of the residual liquor is directly discarded.

7. The process of claim 6 wherein the greater portion of the residual liquor is heated and subsequently admixed with concentrated sodium hydroxide solution or solid sodium carbonate to form a basic neutralizing solution which is mixed with the mother liquor.

8. The process of claim 7 wherein the residual liquor is heated by heat exchange with the hot neutralization mixture formed by the mother liquor and the neutralizing solution; and the salt hydrates are washed with cold water after having been separated from the residual liquor.

9. The process of claim 8 wherein the salt hydrates together with the solid sodium sulfite from the aqueous slurry are dissolved in order to prepare fresh absorbing solution.

10. The process of claim 9 wherein undiluted sodium hydroxide is fed to the neutralization mixture, the neutralization mixture is cooled to the temperature of maximum solubility, and then the salt hydrates are crystallized with further cooling.

11. A process for treating a mother liquor which remains after an aqueous $SO_2$ absorbing solution containing sodium bisulfite and dissolved impurities selected from the group consisting of sodium thiosulfate, sodium chloride and selenium has been heated in order to thereby evaporate $SO_2$ therefrom and to thereby regenerate sodium sulfite for recycle to $SO_2$ absorbing solution, said process comprising a. mixing at least a portion of said mother liquor with a neutralizing agent selected from sodium hydroxide, sodium carbonate or both, using an amount of neutralizing agent which is at least stoichiometrically sufficient to neutralize the sodium bisulfite in the mother liquor, while maintaining the temperature of the neutralized mixture between about 40° C. to 110° C;

b. cooling the neutralized mixture to a temperature of from about $-10°$ C. to 20° C. to crystallize sodium sulfite hydrate from said mixture;

c. separating said crystallized sodium sulfite hydrate from said neutralized mixture, thereby leaving a residual liquor containing the dissolved impurities;

d. recycling said separated sodium sulfite hydrate to the $SO_2$ absorbing solution; and e. recycling a portion of said impurities-containing residual liquor to the neutralized mixture prior to cooling said mixture, while discarding the remaining portion of said impurities-containing residual liquor, the volume ratio of discarded residual liquor to recycled residual liquor ranging from about 1:2 to 1:100.

* * * * *